US009035593B2

(12) United States Patent
Renzi et al.

(10) Patent No.: US 9,035,593 B2
(45) Date of Patent: May 19, 2015

(54) CONTROLLING DYNAMIC SYSTEMS BY MEASURING THE SHORT CIRCUIT CURRENT OF A PHOTOVOLTAIC GENERATOR

(75) Inventors: Virginie Renzi, Chamberry (FR); Nicolas Chaintreuil, Montmelian (FR); Vincent Delpy, Sierentz (FR); Pierre Perichon, Voiron (FR)

(73) Assignees: BUBENDORFF, Attenschwiller (FR); COMMISSARIAT A L'ENERGIE ATOMIQUE ET AUXENERGIES ALTERNATIVES, Paris (FR)

( * ) Notice: Subject to any disclaimer, the term of this patent is extended or adjusted under 35 U.S.C. 154(b) by 113 days.

(21) Appl. No.: 13/882,968

(22) PCT Filed: Oct. 28, 2011

(86) PCT No.: PCT/FR2011/052535
§ 371 (c)(1),
(2), (4) Date: Jun. 24, 2013

(87) PCT Pub. No.: WO2012/059673
PCT Pub. Date: May 10, 2012

(65) Prior Publication Data
US 2013/0327486 A1     Dec. 12, 2013

(30) Foreign Application Priority Data

Nov. 2, 2010 (FR) ..................... 10 59019

(51) Int. Cl.
*E06B 9/68* (2006.01)
*E06B 9/11* (2006.01)
*H02J 7/35* (2006.01)
*H02S 40/38* (2014.01)

(52) U.S. Cl.
CPC ... *E06B 9/68* (2013.01); *E06B 9/11* (2013.01); *H02J 7/35* (2013.01); *Y02E 10/566* (2013.01); *H02S 40/38* (2014.12)

(58) Field of Classification Search
USPC .......................... 318/466–469, 480
See application file for complete search history.

(56) References Cited

U.S. PATENT DOCUMENTS

| | | | | |
|---|---|---|---|---|
| 5,760,558 A | * | 6/1998 | Popat | 318/480 |
| 7,129,657 B2 | * | 10/2006 | Cavarec et al. | 318/280 |
| 8,106,768 B2 | * | 1/2012 | Neumann | 340/539.26 |
| 8,288,646 B2 | * | 10/2012 | Kumar | 136/255 |
| 8,347,938 B2 | * | 1/2013 | Schaumberger et al. | 160/176.1 P |
| 8,575,877 B2 | * | 11/2013 | Liu | 318/480 |
| 8,678,067 B2 | * | 3/2014 | Berezhnyy et al. | 160/1 |
| 2006/0000558 A1 | | 1/2006 | Fennell | |

FOREIGN PATENT DOCUMENTS

DE   34 08 396 A1   9/1985
DE   42 08 469 A1   9/1993

* cited by examiner

*Primary Examiner* — Katherine Mitchell
*Assistant Examiner* — Justin Rephann
(74) *Attorney, Agent, or Firm* — Andrew W. Chu; Craft Chu PLLC (57) ABSTRACT

The dynamic system is part of a dynamic apparatus having at least one photovoltaic generator, at least one battery and at least one device for controlling the dynamic apparatus. The method for controlling the dynamic system on the basis of sunlight involves electrically isolating the photovoltaic generator from the battery, reading the short circuit current of the isolated photovoltaic generator, determining a numerical value based on the short circuit current, said numerical value corresponding to the reading of the short circuit current, and comparing the numerical value determined with at least one reference threshold value. When the numerical value determined corresponds to a value range limited by at least one such reference threshold value, the dynamic system is controlled so as to thereon confer a configuration corresponding to the value range.

16 Claims, 6 Drawing Sheets

CONTROLLING DYNAMIC SYSTEMS BY MEASURING THE SHORT CIRCUIT CURRENT OF A PHOTOVOLTAIC GENERATOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention concerns a method for controlling a dynamic system that is part of a dynamic apparatus, on the basis of the sunlight.

Said invention also relates to a dynamic apparatus comprising a dynamic system, a photovoltaic generator as well as a device for controlling said dynamic apparatus on the basis of the sunlight.

Said invention concerns the field of manufacturing dynamic apparatus self-sufficient in energy and comprising a dynamic system, a photovoltaic generator as well as a battery supplied with electrical energy by the photovoltaic generator and supplying the dynamic system with energy.

2. Description of Related Art Including Information Disclosed Under 37 CFR 1.97 and 37 CFR 1.98

Dynamic apparatus of this type is already known, in the form of a shading device such as a blind or similar.

In particular, in U.S. Pat. No. 5,675,487 a device is described for controlling energy through a window. This device comprises a blind, constituting a dynamic system, photovoltaic generators, a battery as well as light sensors to capture the sunlight and providing information on the basis of which the dynamic system is controlled.

It is also known to have document FR2.740.825 relating to an installation for controlling solar protection units. Such an installation comprises solar protection units as well as means for actuating said units. Said installation also comprises an automatic shade control system. Said system comprises a sensor, remote from the actuators and equipped with means for measuring the intensity of the solar radiation and means for measuring at least one other meteorological phenomenon. Said system also comprises means of supplying the sensor with electrical energy, said supply means consisting, in particular, of a photovoltaic generator.

In document WO2010/079407 a method is described for operating home automation equipment for motor-driven solar protection. Said installation comprises a blind, a photovoltaic generator serving as an energy collector, a battery as well as a remote solar sensor which, if it detects direct sunlight, controls the deployment of the blind.

In any event, the dynamic apparatus known in the prior art comprises, on the one hand, a photovoltaic generator usually used to charge with electricity a battery intended to supply a dynamic system that is part of such a dynamic apparatus, and on the other hand, a solar sensor, designed to detect solar radiation for the purpose of controlling the dynamic system, in addition to the photovoltaic generator and remote from the dynamic system.

Apart from the fact that such a solar sensor constitutes an additional element to the dynamic apparatus, it may be remote from the dynamic system and therefore be positioned in a place not representative of the conditions in the environment of said dynamic system, in particular in a shaded place. Moreover, such a sensor is usually some distance from the dynamic system to be controlled so that it is necessary to transmit the information captured by said sensor to the dynamic system. Such transmission may be achieved either by a wired link requiring an electric cable, impractical to install, and even unattractive, or a radio or Wi-Fi link requiring at least one receiver on the dynamic system and representing a more costly solution than the wired link.

SUMMARY OF THE INVENTION

This invention is intended to remedy the disadvantages of the dynamic apparatus of the prior art.

To this effect, the invention relates to a method of controlling, on the basis of the sunlight, a dynamic system that is part of a dynamic apparatus, which in turn comprises at least one photovoltaic generator, at least one battery for storing the electrical energy supplied by the photovoltaic generator and for supplying the dynamic system with electrical energy and at least one device for controlling said dynamic apparatus.

Said method involves:
- electrically isolating the photovoltaic generator from the battery;
- reading the short circuit current Icc of the isolated photovoltaic generator;
- based on at least one reading of the short circuit current Icc, determining a numerical value Ipv corresponding to the reading or readings of the short circuit current Icc and comparing said numerical value Ipv determined with at least one reference threshold value (Ithreshold1; Ithreshold2);
- when said numerical value Ipv determined corresponds to a value range limited by at least one such reference threshold value (Ithreshold1; Ithreshold2), controlling the dynamic system so as to thereon confer a configuration corresponding to said value range.

Additionally, the method also involves, before operating the dynamic system:
- electrically isolating the photovoltaic generator from the battery;
- reading the no-load voltage Vo of the photovoltaic generator;
- on the basis of the no-load voltage Vo reading, determining a numerical value Vpv corresponding to said no-load voltage Vo reading;
- and, when controlling the dynamic system, controlling said dynamic system so as to thereon confer a configuration determined on the basis of at least one of the numerical values Ipv and/or Ipv and Vpv determined.

The invention also concerns a dynamic apparatus, in particular for the implementation of the method according to any one of the preceding claims, comprising a dynamic system, a photovoltaic generator, a battery supplied with electrical energy by the photovoltaic generator and supplying the dynamic system with electrical energy, and at least one device for controlling said dynamic apparatus on the basis of the sunlight.

Said dynamic apparatus is characterised by the fact that the device for controlling the dynamic apparatus comprises at least:
means for electrically isolating the photovoltaic generator from the battery;
means for reading the short circuit current Icc of the photovoltaic generator;
means for determining a numerical value Ipv corresponding to at least one short circuit current Icc reading;
means for comparing said numerical value Ipv determined with at least one reference threshold value (Ithreshold1; Ithreshold2);
means for controlling at least said isolating means, said means for determining a numerical value Ipv as well as said means for comparing;
means for controlling the dynamic system according to the result of the comparison between said numerical value Ipv determined and at least one such reference threshold value (Ithreshold1; Ithreshold2).
Additionally, said dynamic apparatus also comprises:
another means for electrically isolating the photovoltaic generator from the battery;
means for reading the no-load voltage Vo of the photovoltaic generator;
means for determining a numerical value Vpv corresponding to said no-load voltage Vo reading;
means for comparing said numerical value Vpv determined with at least one reference threshold value (Vthreshold1; Vthreshold2);
means for controlling at least the means for electrically isolating, the means for determining a numerical value Vpv as well as the means for comparing;
means for controlling the dynamic system according to the result of the comparison between said numerical value Vpv determined and at least one such reference threshold value (Vthreshold1; Vthreshold2).

This invention also involves reading at least a short circuit current of the photovoltaic generator and, on the basis of at least one short circuit current reading, controlling the dynamic apparatus, more particularly the dynamic system that is part of this dynamic apparatus. This invention therefore, advantageously, involves taking advantage of an electrical quantity provided directly by the photovoltaic generator to control said dynamic apparatus and no longer, as in the prior art, of having to use an additional and, what is more, remote sensor to provide such control.

In the particular case of a dynamic apparatus comprising a shading device, controlling said dynamic apparatus on the basis of the short circuit current makes it possible, advantageously, to partially close (or leave with openings), the dynamic system, more particularly comprising a roller shutter apron, on the basis of the sunlight.

This invention also involves reading the no-load voltage of the photovoltaic generator, and, on the basis of said no-load voltage reading, controlling the dynamic apparatus. Once again, the invention involves taking advantage of a quantity provided directly by the photovoltaic generator to control the dynamic apparatus.

In particular, measuring the no-load voltage makes it possible, advantageously, to detect the sunrise/sunset and therefore to provide twilight control of the dynamic apparatus.

In the particular case of a dynamic apparatus comprising a shading device, in particular a roller shutter or similar, the use of the no-load voltage of the photovoltaic generator makes it possible, advantageously, to provide twilight opening/closing of a dynamic system, more particularly comprising a roller shutter apron.

In any event, this invention makes it possible, advantageously, to control a dynamic apparatus (more particularly a dynamic system that is part of such a dynamic apparatus), on the basis of electrical quantities provided directly by the photovoltaic generator and not, as in the prior art, by an additional, and possibly remote, sensor.

BRIEF DESCRIPTION OF THE DRAWINGS

Other purposes and benefits of this invention will become clear in the course of the description that follows relating to the embodiments, which are given by way of indicative but not limitative examples.

Comprehension of said description will be facilitated by referring to the drawings enclosed.

DETAILED DESCRIPTION OF THE DRAWINGS

This invention relates to the field of manufacturing dynamic apparatus self-sufficient in energy.

Figure 1:
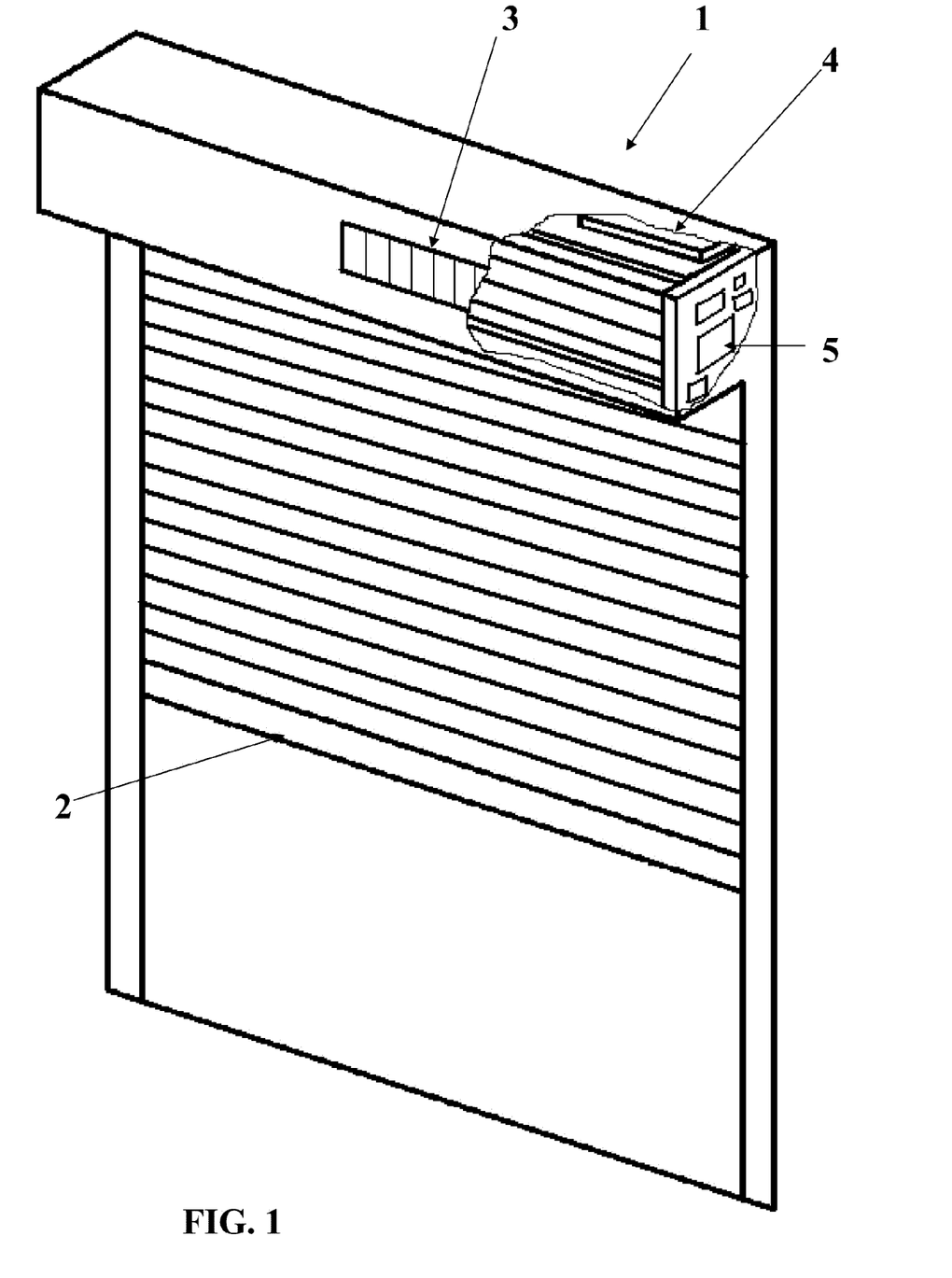
FIG. 1 is a schematic view in elevation of a dynamic apparatus comprising a roller shutter.

Non-limitatively, such a dynamic apparatus may consist of a heating appliance, an air conditioner, a ventilator, or a centralised power system (BMS or other), a solar protection device or other. Such a dynamic apparatus may also be a roller shutter, which corresponds to a particular embodiment of such a dynamic apparatus to which particular reference will be made in the rest of the description and which is illustrated in FIG. 1.

Whatever the type of said dynamic apparatus 1, the latter comprises a dynamic system 2 which, in the particular case of a roller shutter, consists of least an apron resulting from the assembly of a plurality of slats, and possibly also of a motorised shaft onto which said apron is rolled and from which it is unrolled.

Such dynamic apparatus 1 also comprises a photovoltaic generator 3, more particularly consisting of a photovoltaic panel, which, in the particular case of a roller shutter, may be fixed onto a box that is part of said roller shutter and which contains said motorised shaft.

Such dynamic apparatus 1 also comprises a battery 4, supplied with electrical energy by the photovoltaic generator, and supplying the dynamic system 2 with electrical energy. In the particular case of a roller shutter, such a battery 4 is, once again, located in the shutter box.

Finally, said dynamic apparatus 1 comprises a device 5 for controlling said dynamic apparatus 1. In a preferred embodiment said control device 5 consists at least in part of an electronic board, located notably inside a roller shutter box.

As mentioned above, such a dynamic apparatus 1 comprises a photovoltaic generator 3 designed to receive solar irradiance and to supply electrical energy to said battery 4 under the effect of said solar irradiance.

In a first inventive step, it was conceived that the short circuit current Icc of the photovoltaic generator 3 would be read under the effect of solar irradiance.

Figure 2:
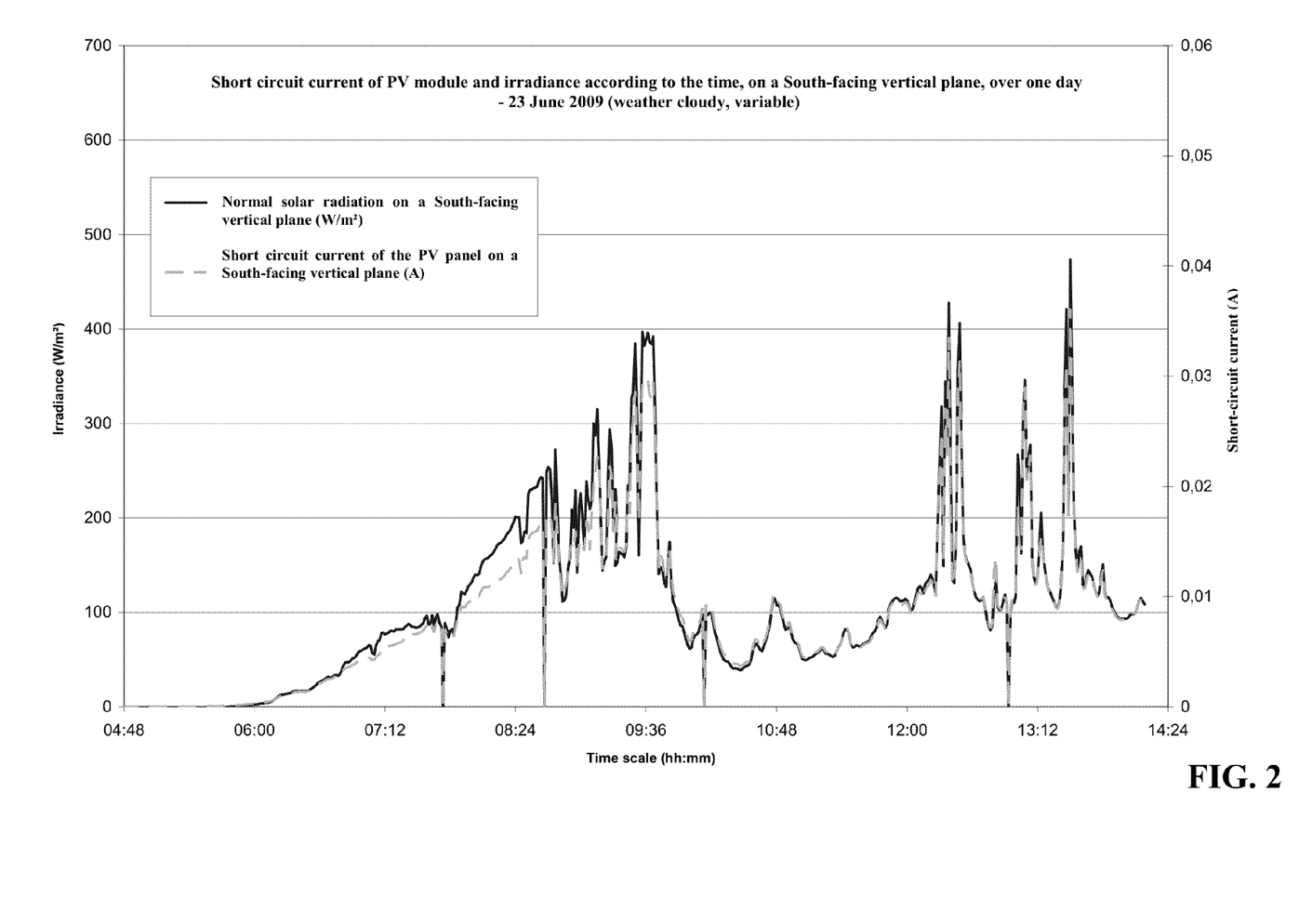
FIG. 2 is a graph showing, according to the weather, the evolution of the solar radiation resulting from solar irradiance and the short circuit current of a photovoltaic generator subject to said solar irradiance.

Thus, in the graph in FIG. 2, the evolution of said short circuit current Icc (in amps) has been shown according to the weather, over the course of one day under the effect of such solar irradiance.

In the same graph in FIG. 2, again according to the weather, the evolution has been shown of the solar radiation (measured using a pyranometer or similar and expressed in W/m2) to which the photovoltaic generator 3 was subject, during the course of the same day and under the effect of the same solar irradiance.

The joint representation of the evolution of the short circuit current Icc and the solar radiation has demonstrated a direct correlation between said two quantities.

This correlation has led the inventors to develop said invention consisting of controlling the operation of a dynamic apparatus 1 on the basis of the sunlight, using measurements of the short circuit current Icc of the photovoltaic generator 3.

According to a second inventive step, it was conceived that, at the terminals of said photovoltaic generator 3, a no-load voltage Vo delivered under the effect of solar irradiance would be read.

Figure 3:
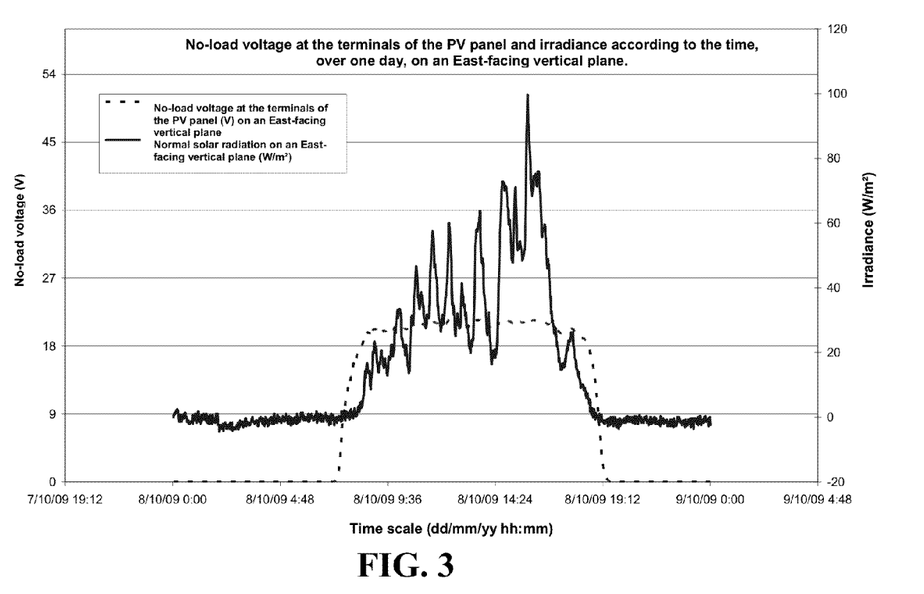
FIG. 3 is a graph showing, according to the weather, the evolution of the solar radiation resulting from solar irradiance and the no-load voltage of a photovoltaic generator subject to said solar irradiance.
Figure 4:
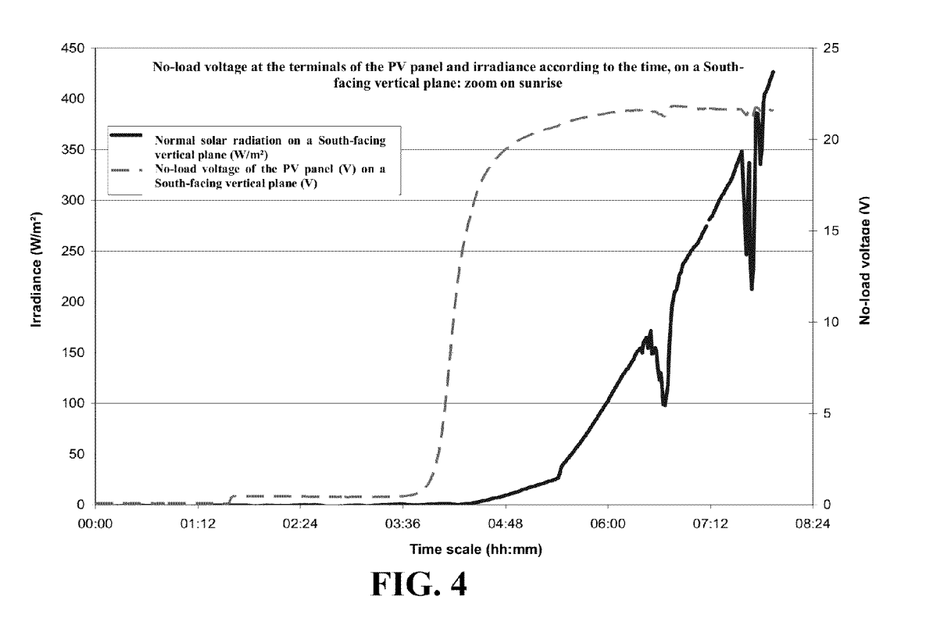
FIG. 4 corresponds to an enlargement of the graph shown in FIG. 3.

Thus, in the graphs in FIGS. 3 and 4, the evolution of said no-load voltage Vo has been shown (in Volts) according to the weather, over the course of one day under the effect of said solar irradiance.

In the same graphs in FIGS. 3 and 3, again according to the weather, the evolution has been shown of the solar radiation (once again measured using a pyranometer or similar and expressed in W/m2) to which the photovoltaic generator 3 is subject, during the course of the same day and under the effect of the same solar irradiance.

The joint representation of the evolution of the no-load voltage Vo and the solar radiation has demonstrated that:
the increase in solar radiation corresponding to sunrise, corresponds substantially to an increase in the no-load voltage Vo of the photovoltaic generator 3;
the reduction in solar radiation corresponding to sunset corresponds substantially to a reduction in said no-load voltage Vo.

The correlation between the solar radiation and the no-load voltage Vo of the photovoltaic generator 3 has led the inventors to develop this invention consisting of controlling the operation of a dynamic apparatus 1 on the basis of the sunlight, using measurements of the no-load voltage Vo at the terminals of the photovoltaic generator 3.

This invention consists, in fact, of a method for controlling a dynamic apparatus 1 (more particularly a dynamic system 2 that is part of such a dynamic apparatus 1), on the basis of the sunlight.

According to the invention, said method of controlling involves:
electrically isolating the photovoltaic generator 3 from the battery 4;
reading the short circuit current Icc of the isolated photovoltaic generator 3;
based on at least one reading of the short circuit current Icc, determining a numerical value Ipv corresponding to the reading or readings of the short circuit current Icc and comparing said numerical value Ipv determined with at least one reference threshold value (Ithreshold1; Ithreshold2);
when said numerical value Ipv determined corresponds to a value range limited by at least one such reference threshold value (Ithreshold1; Ithreshold2), controlling the dynamic system 2 so as to thereon confer a configuration corresponding to said value range.

In fact and in a preferred embodiment of the invention, said method consists of:
taking, at intervals over time, a reading of the short circuit current Icc at the terminals of the isolated photovoltaic generator 3;
for each short circuit current Icc reading, determining an intermediate numerical value Ipv' corresponding to such a short circuit current Icc reading;
determining a numerical value Ipv by calculating the average of the intermediate numerical values Ipv' corresponding to a plurality of said short circuit current Icc readings;
comparing said numerical value Ipv determined with at least one reference threshold value (Ithreshold1; Ithreshold2);
controlling the dynamic system 2 according to the result of said comparison.

Preferentially, when a numerical value Ipv is determined, the average is calculated of the intermediate numerical values Ipv' corresponding to a given number N of short circuit current Icc readings chosen from among the last short circuit current Icc readings taken.

In fact, said number N varies from 2 to 10 and is preferably equal to 5.

Such an embodiment then involves calculating a rolling average of the intermediate numerical values Ipv', so as to determine a numerical value Ipv to be compared with at least one reference threshold value (Ithreshold1; Ithreshold2).

Additionally, the method involves isolating the photovoltaic generator 3, reading the short circuit current Icc, determining the numerical value Ipv corresponding to at least one short circuit current Icc reading and comparing said numerical value Ipv determined with at least one reference threshold value (Ithreshold1; Ithreshold2), at predetermined and/or regular intervals.

In fact, such an interval is chosen according to the needs of the application and the electronic components of the dynamic apparatus 1.

More particularly, said interval is between 2 and 15 minutes inclusive, preferably of the order of 5 minutes.

It will be noted that such an interval is sufficiently precise to be able to detect a meteorological change.

Thus, on the one hand, by implementing said method at regular intervals (for example every 5 minutes) and, on the other hand, by determining a numerical value Ipv by calculating the average of the intermediate numerical values Ipv' corresponding to a given number N of short circuit current Icc readings (for example N=5), the dynamic system 2 is controlled sufficiently precisely to detect a meteorological change, while smoothing over cloudy passages.

According to another characteristic of the method, the photovoltaic generator 3 is isolated, the short circuit current Icc is read, the numerical value Ipv corresponding to at least one short circuit current Icc reading is determined and said numerical value Ipv determined is compared with at least one reference threshold value (Ithreshold1; Ithreshold2), successively.

As mentioned above, one step in the method involves electrically isolating the photovoltaic generator 3.

In this respect, it will be noted that such an electrical isolation of the photovoltaic generator 3 is made temporarily, for at least the time necessary to enable the implementation of the above-mentioned control method whereas for the rest of the time the photovoltaic generator 3 is connected to the battery 4 in order to charge the latter.

In fact, it will be noted that said photovoltaic generator 3 is isolated at least while the short circuit current Icc of said photovoltaic generator 3 is read, and even while a numerical value Ipv corresponding to at least one short circuit current Icc reading is determined and/or while said numerical value Ipv determined is compared with at least one reference threshold value (Ithreshold1; Ithreshold2).

Another step in said method involves determining a numerical value Ipv or an intermediate numerical value Ipv', corresponding to a short circuit current Icc reading.

Thus, when such a numerical value Ipv, or an intermediate numerical value Ipv', is determined, first of all the short circuit current Icc reading is converted into a voltage Vcc and then said voltage Vcc or an amplification of said voltage Vcc is converted into a numerical value Ipv, or into an intermediate numerical value Ipv', corresponding to said voltage Vcc and said short circuit current Icc reading.

Yet another step in said method involves comparing the numerical value Vpv determined with at least one reference threshold value (Vthreshold1; Vthreshold2).

However, before comparing said numerical value Ipv determined with at least one such reference threshold value (Ithreshold1; Ithreshold2), such a reference threshold value (Ithreshold1; Ithreshold2) is set, either by setting an adjustable potentiometer (notably one which is part of said control device) or by saving such a reference threshold value (Ithreshold1; Ithreshol2) in a memory (notably one which is part of said control device 5).

In fact, such a reference threshold value (Ithreshold1; Ithreshold2) will be set on the basis of values taken from the literature and/or values determined experimentally (more particularly by means of temperature probes, sensors, in particular solar radiation sensors) and/or values determined by digital simulation (more particularly by means of equation solvers such as EES or Scilab, computation software such as Matlab, dynamic simulation software such as TRNSYS, Ecotect, Energy Plus or similar) and/or values determined by calculation (more particularly by means of equations, charts or others).

An additional characteristic involves, when the short circuit current Icc of the isolated photovoltaic generator 3 is read, also reading the temperature T of the control device 5 and, either authorising the operation of the dynamic system 2 when said temperature T is higher than a threshold temperature Ts, or inhibiting the operation of said dynamic system 2 when said temperature is lower than said threshold temperature Ts.

It will be noted that said threshold temperature Ts will have been determined in advance experimentally, validated by simulation for the chosen application, and may be adjusted according to need. In a particular embodiment, the threshold temperature Ts will be between 0 and 10° C., more particularly of the order of 5° C.

As mentioned above, the dynamic apparatus 1 comprises a photovoltaic generator 3 as well as a battery 4, supplied by said photovoltaic generator 3, and supplying the dynamic system 2 with electrical energy. In this respect, it will be noted that the quantity of energy stored in said battery 4 may be insufficient to operate the dynamic system 2, in particular if there is a lack of sunlight for a prolonged period. In order to compensate for said disadvantage, the dynamic apparatus 1 is designed to enable the dynamic system 2 to be supplied by an external voltage source (for example a mains supply or backup battery).

Thus, at the moment of implementing the control method according to the invention, the short circuit current Icc may reach a value that is destructive to the means 56 for electrically isolating the photovoltaic generator 3 and/or to at least part of the means 57 for determining a numerical value Ipv corresponding to at least one short circuit current Icc reading (more particularly the current-to-voltage converter 570).

Thus, and according to an additional characteristic of the invention, before electrically isolating the photovoltaic generator 3, said means 56 for electrically isolating the photovoltaic generator 3 and/or said part at least of the means 57 for determining a numerical value Ipv corresponding to at least one short circuit current Icc reading is protected, when the short circuit current Icc is higher than a defined setpoint.

In a preferred embodiment, said setpoint is defined, on the one hand, as higher than the maximum current that can be delivered by the photovoltaic generator 3 and, on the other hand, lower than the current destructive to the means 56 for electrically isolating the photovoltaic generator 3 and/or at least a part of the means 57 for determining a numerical value Ipv.

In fact, when the means 56 for isolating the photovoltaic generator 3 consists at least in part of an electromechanical relay, such protection is afforded by limiting the short circuit current Icc (in particular by peak-limiting said short circuit current Icc) which has the effect of interrupting (at least for a given length of time, notably a few minutes) the operation, using the control means 59, of said means 56 for electrically isolating the photovoltaic generator 3.

However, when said isolating means 56 comprises a diode with a very low leakage current as well as a switching transistor, such protection is afforded by limiting the conduction of said isolating means 56 (more particularly to limit the conduction of the transistor that is part of said means 56).

The method described above makes it possible, in fact, to control the dynamic apparatus 1 (more particularly at least the dynamic system 2) on the basis of the sunlight.

In fact and as mentioned above, said control method involves, when said numerical value Ipv determined corresponds to a value range limited by at least one such reference threshold value (Ithreshold1; Ithreshold2), controlling the dynamic system 2 so as to thereon confer a configuration corresponding to said value range.

Thus and in a particular embodiment of the invention, said control method may involve, when the numerical value Ipv determined is lower than a first reference threshold value Ithreshold1, controlling the dynamic system 2 so as to thereon confer a first configuration.

In the particular case of a dynamic apparatus 1 consisting of a roller shutter, said first configuration may consist of a position where the apron of said roller is completely closed.

Said method may then also involve, when the numerical value Ipv determined is higher than a first reference threshold value Ithreshold1:
  either controlling the dynamic system so as to thereon confer a second configuration when the numerical value Ipv determined is higher than a second reference threshold value Ithreshold2;
  or controlling the dynamic system so as to thereon confer a third configuration when the numerical value Ipv determined is lower than the second reference threshold value Ithreshold2;

In the particular case of a dynamic apparatus 1 consisting of a roller shutter, said second configuration may consist of a partially closed position (closed with openings) of the apron of said roller shutter whilst said third configuration may consist of said apron being completely open.

As mentioned above, the method according to the invention involves controlling the dynamic apparatus 1 (more particularly the dynamic system 2) on the basis of the short circuit current Icc of the photovoltaic generator 3.

In fact, the invention also relates to a dynamic apparatus 1, notably designed for the implementation of said method.

As mentioned above, such a dynamic apparatus 1 comprises a dynamic system 2, a photovoltaic generator 3, a battery 4 (supplied with electrical energy by the photovoltaic generator and supplying the dynamic system with electrical energy) and a device 5 for controlling the dynamic apparatus 1 (more particularly the dynamic system that is part of said dynamic apparatus 2) on the basis of the sunlight.

Figure 5:
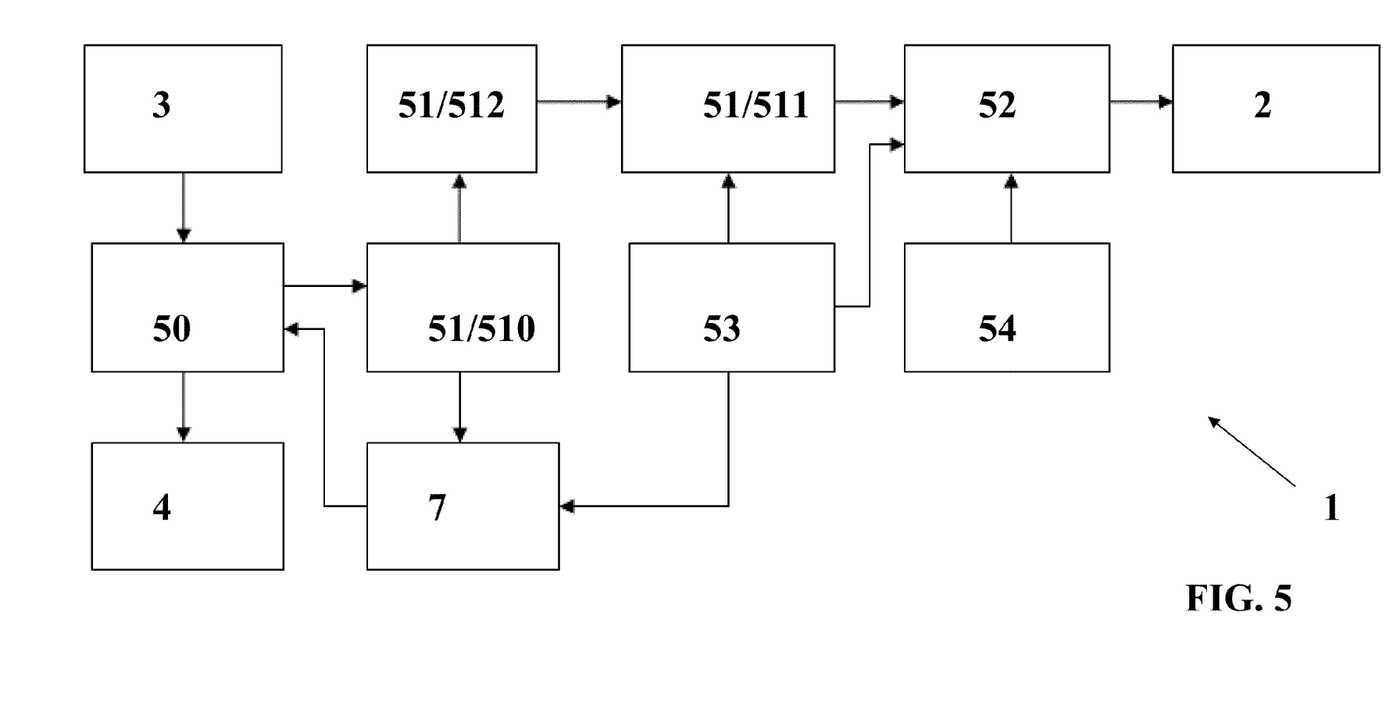
FIG. 5 is a block diagram of a dynamic apparatus according to the invention.
Figure 6:
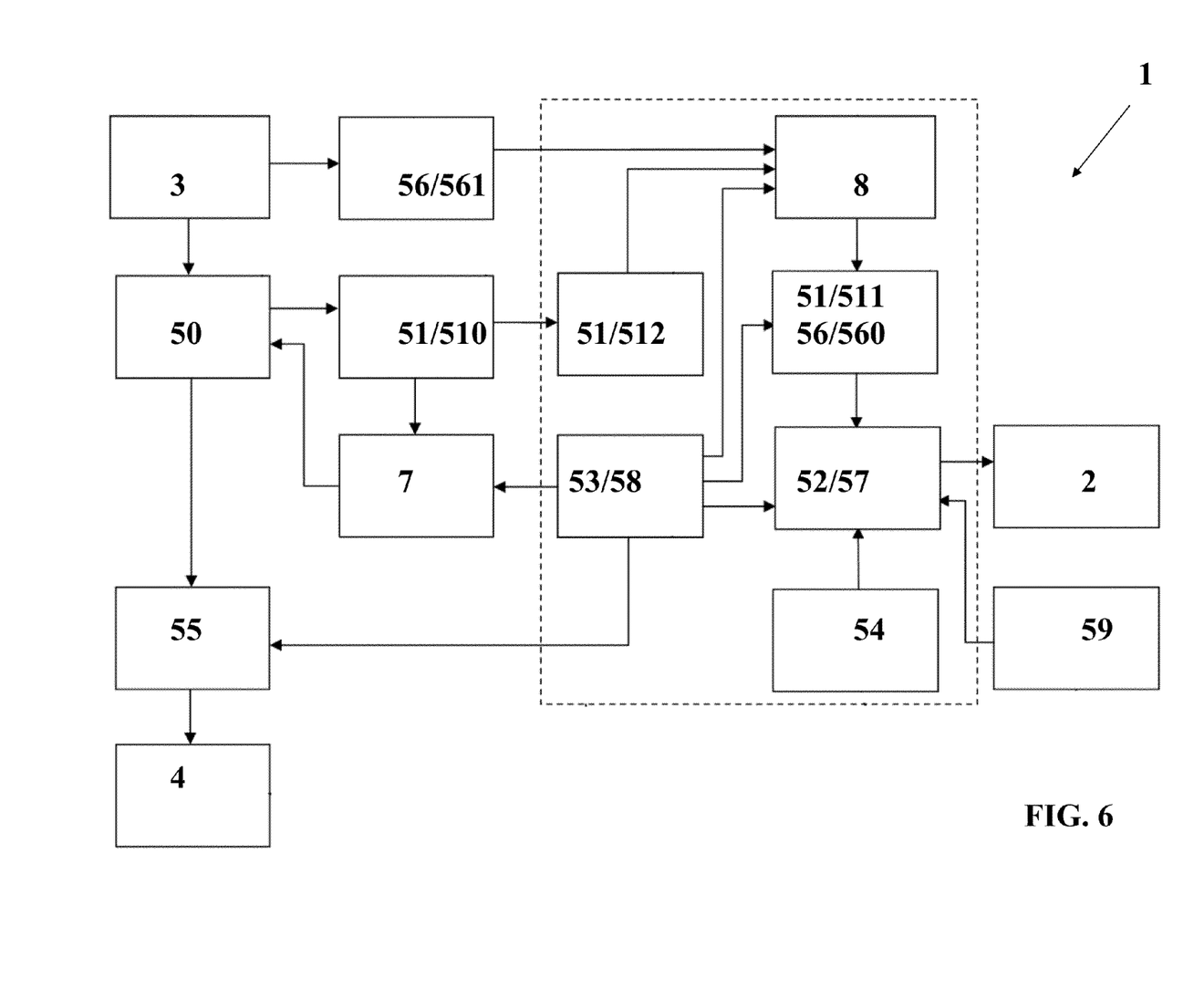
FIG. 6 is a block diagram of an dynamic apparatus according to the invention and corresponding to a more sophisticated embodiment than that illustrated in FIG. 5.

According to the invention and as shown in FIGS. 5 and 6, said device 5 for controlling such a dynamic apparatus 1 comprises at least:

- means 50 for electrically isolating (temporarily) the photovoltaic generator 3 from the battery 4;
- means for reading the short circuit current Icc of the photovoltaic generator 3;
- means 51 for determining a numerical value Ipv corresponding to at least one short circuit current Icc reading;
- means 52 for comparing said numerical value Ipv determined with at least one reference threshold value (Ithreshold1; Ithreshold2);
- means 53 for controlling at least said isolating means 50, said means 51 for determining a numerical value Ipv as well as said means 52 for comparing;
- means for controlling the dynamic system 2 according to the result of the comparison between said numerical value Ipv determined and at least one such reference threshold value (Ithreshold1; Ithreshold2).

As far as the means 50 for electrically isolating the photovoltaic generator 3 is concerned, this can, in a first embodiment, consist at least partly of an electromechanical relay placed between the photovoltaic generator 3 and the battery 4, and comprising a normally closed contact and a coil, more particularly supplied by the battery 4.

However, in a second embodiment, the means 50 for electrically isolating the photovoltaic generator 3 comprises, on the one hand, a diode with a very low leakage current placed between the photovoltaic generator 3 and the battery 4 and, on the other hand, a switching transistor (of the power MOSFET type or similar) placed upstream of said diode.

In such an embodiment, when the transistor is conductive, the diode is reverse biased and therefore no longer conductive. The physical disconnection of the battery 4 is then no longer necessary.

Said control device 5 also comprises means 51 for determining a numerical value Ipv corresponding to at least one short circuit current Icc reading;

Said means 51 for determining such a numerical value Ipv comprises, on the one hand, at least means 510 for converting the short circuit current Icc reading into a voltage Vcc and, on the other hand, at least means 511 for converting the analog signal of such a voltage Vcc (more particularly the voltage Vcc converted by the conversion means 510) into a numerical value Ipv corresponding to said voltage Vcc.

As mentioned above, the method according to the invention may also involve determining a numerical value Ipv corresponding to a plurality of short circuit current Icc readings.

In such a case, said means 51 for determining such a numerical value Ipv comprises, on the one hand, at least means 510 for converting each short circuit current Icc reading into a voltage Vcc and, on the other hand, at least means 511 for converting the analog signal of such a voltage Vcc (in particular the voltage Vcc converted by the conversion means 510) into an intermediate numerical value Ipv' corresponding to said voltage Vcc and, further, means for calculating the average of the intermediate numerical values Ipv' to obtain the numerical value Ipv corresponding to the plurality of short circuit current Icc readings.

As far as the means 510 for converting the short circuit current Icc reading into a voltage Vcc, the latter may consist of a current sensor, more particularly of the Hall effect type.

However, and in a preferred embodiment of the invention, said conversion means 510 consists of a resistor with a very low value (1 ohm or less) enabling the voltage at the terminals of said resistor to be proportional to the current passing through it.

According to another characteristic, said resistor will have a power calculated according to the maximum current delivered by the photovoltaic generator 3 when the illumination level is at its highest (the current measured is directly linked to the intensity of the incident solar radiation).

In a preferred embodiment of the invention, the value of the resistor is 1 ohm which makes it possible to obtain a simple conversion factor (1 mA; 1 mV) with only a small voltage drop (330 mV for 300 mA) and with negligible power dissipation (90 mW for 300 mA).

As far as the means 511 for converting the analog signal of a voltage Vcc into a numerical value Ipv corresponding to said voltage Vcc is concerned, the latter consists of an analog-to-digital converter.

Such an analog-to-digital converter may be of the standalone type (8, 10, 12 or 16 bits) or (preferably) will consist of a microcontroller that is part of the control device 5.

As mentioned above, the control method involves reading a short circuit current Icc and converting said short circuit current Icc into a voltage Vcc. Now, said voltage Vcc may be quite low (more particularly a few mV when the illumination level is weak), so that it is necessary to amplify it in order to be able to determine a numerical value Ipv liable to be compared with a threshold value (Ithreshold1; Ithreshold2).

In order to do this, the means 51 for determining a numerical value Ipv, or an intermediate numerical value Ipv', also comprises an amplifier 512 placed between the means 510 for converting a short circuit current Icc reading into a voltage Vcc and the means 511 for converting the analog signal of such a voltage Vcc into a numerical value Ipv, or into an intermediate numerical value Ipv'.

Such an amplifier 512 is designed to amplify the converted voltage Vcc which is low when the illumination level is weak.

In fact, such an amplifier 512 may consist either of a transistor device (in particular a common emitter amplifier) or an operational amplifier (more particularly mounted as a non-inverting amplifier).

It will be noted that said amplifier 512 has a gain that is calculated so that its output delivers, for a maximum illumination level of the photovoltaic generator 3, a voltage corresponding to the upper limit of the range admissible by the analog-to-digital converter 511.

As mentioned above, the control device 5 comprises means 53 for controlling at least said isolating means 50, said means 51 for determining a numerical value Ipv (more particularly the means 511 for converting the analog signal into a numerical value) as well as said means 52 for comparing.

Such control means 53 is designed to control, at predetermined and/or regular intervals, at least said isolating means 50, said means 51 for determining a numerical value Ipv as well as said means 52 for comparing, and even said means for reading and/or said means for operating.

In this respect, it will be noted that in the particular case of a roller shutter, said control means 53 may be designed to provide said control at predetermined, regular intervals of between 2 and 15 minutes inclusive, preferably of the order of 5 minutes.

Additionally, said control means 53 may also be designed to control, successively, the isolating means 50, the means 51 for determining a numerical value Ipv and the means 52 for comparing.

In a preferred embodiment of the invention, such control means 53 consists of a measurement sequencer designed to regulate the operations necessary to operate the dynamic system 2, namely to isolate the photovoltaic generator 3, then to trigger the analog-to-digital conversion, and after that to carry out the comparison and finally to reconnect the photovoltaic generator 3.

According to an additional characteristic, the control device 5 also comprises at least means 54 for setting at least one reference threshold value (Ithreshold1; Ithreshold2).

Such means 54 for setting parameters may consist either of an adjustable potentiometer or similar, or a memory containing at least one settable reference threshold value (Ithreshold1; Ithreshold2). Such a memory will be of the non-volatile type and may be internal or external.

According to another characteristic, the control device 5 comprises a microcontroller 6 incorporating at least a part of the means 51 for determining a numerical value Ipv corresponding to at least one short circuit current Icc reading (more particularly the analog-to-digital converter 510, and even also means for calculating the average of the intermediate numerical values Ipv') and/or the means 52 for comparing said numerical value Ipv determined with at least one reference threshold value (Ithreshold1; Ithreshold2), and even also depending on the case, the control means 53 and/or the memory 54 containing at least one settable reference threshold value (Ithreshold1; Ithreshold2) and/or the amplifier 512.

In this respect, it will be noted that the means 52 for comparing that is part of said microcontroller 6 consists, more particularly, of a software routine.

It will be noted that such a microcontroller 6 possesses clock circuits (timers) able, advantageously, to be used to implement the measurement sequencer function and constituting, at least partly said control means 53.

Said control means 53 may then use, advantageously, at least one clock circuit to control, at predetermined and/or regular intervals, at least said isolating means 50, said means 51 for determining a numerical value Ipv as well as said means 52 for comparing, more particularly successively.

According to an additional characteristic, the control device 5 also comprises means of reading the temperature of the device 5 to control the dynamic apparatus 1, more particularly the dynamic system 2. In fact, such means of reading the temperature is, more particularly, designed to read the temperature of an electronic board that is part of said control device 5.

The dynamic apparatus 1 comprises a photovoltaic generator 3 as well as a battery 4, supplied by said photovoltaic generator 3, and supplying the dynamic system 2 with electrical energy. As mentioned above, said dynamic apparatus 1 may also comprise an external voltage source (for example a mains supply or backup battery) designed to supply the dynamic system 2 when the quantity of energy stored in the battery 4 is insufficient to operate said dynamic system 2.

In such a case, the dynamic apparatus 1 also comprises means 7 for protecting the means 50 for electrically isolating the photovoltaic generator 3 and/or at least a part of the means 51 for determining a numerical value Ipv corresponding to at least one short circuit current Icc reading (more particularly the current-to-voltage converter 510), when the short circuit current Icc reaches a value destructive to said means 50 for electrically isolating the photovoltaic generator 3 and/or for at least a part of said means 51 for determining a numerical value Ipv.

In fact, said protection means 7 is more particularly designed to protect said means 50 for electrically isolating the photovoltaic generator 3 and/or at least said part of the means 51 for determining a numerical value Ipv, when the short circuit current Icc is higher than a defined setpoint.

In a preferred embodiment, said setpoint is defined, on the one hand, as higher than the maximum current that can be delivered by the photovoltaic generator 3 and, on the other hand, lower than the current destructive to the means 50 for electrically isolating the photovoltaic generator 3 and/or at least a part of the means 51 for determining a numerical value Ipv.

In a preferred embodiment of the invention, said protection means 7 consists of a protection circuit placed between the means 50 for isolating the photovoltaic generator 3 and the means 53 for controlling said isolating means 50. Thus, when the means 50 for isolating the photovoltaic generator 3 consists at least in part of an electromechanical relay, said protection means 7 (more particularly the protection circuit) is designed to limit the short circuit current Icc (in particular by peak-limiting said short circuit current Icc), and then to interrupt (at least for a given length of time, notably a few minutes) the operation, using the control means 53, of said means 50 for electrically isolating the photovoltaic generator 3, when the short circuit current Icc is higher than a defined setpoint.

However, when said isolating means 50 comprises a diode with very a low leakage current as well as a switching transistor, the protection means 7 (more particularly the protection circuit) is designed to limit the conduction of said isolating means 50 (more particularly to limit the conduction of transistor that is part of said means 50), when the short circuit current Icc is higher than a defined setpoint.

In fact, said protection circuit (constituting the protection means 7) may then comprise a feedback loop acting on said switching transistor.

As mentioned above, the control device 5 comprises means 53 for controlling at least said means 50 for electrically isolating, said means 51 for determining a numerical value Vpv as well as said means 52 for comparing.

According to an additional characteristic, said control means 53 may again be designed to also control the means 7 for protecting the means 50 for electrically isolating the photovoltaic generator 3.

As mentioned above, said invention involves controlling the dynamic apparatus 1 (more particularly at least the dynamic system 2 that is part of said dynamic apparatus 1) on the basis of the sunlight, using at least one reading of the short circuit current Icc of the photovoltaic generator 3.

Additionally, the method according to the invention also involves controlling said dynamic apparatus 1 on the basis of at least one reading of the no-load voltage of the photovoltaic generator 3. Said method then involves:

electrically isolating the photovoltaic generator 3 from the battery 4;

reading the no-load voltage Vo of the photovoltaic generator (3);

on the basis of the no-load voltage Vo reading, determining a numerical value Vpv corresponding to said no-load voltage Vo reading and comparing said numerical value Vpv determined with at least one reference threshold value (Vthreshold1; Vthreshold2);

when said numerical value Vpv determined corresponds to a value range limited by at least one such reference threshold value (Vthreshold1; Vthreshold2), controlling the dynamic system 2 so as to thereon confer a configuration corresponding to said value range.

In fact, said method involves, more particularly, before operating the dynamic system 2:

electrically isolating the photovoltaic generator 3 from the battery 4;

reading the no-load voltage Vo of the isolated photovoltaic generator 3;

on the basis of the no-load voltage Vo reading, determining a numerical value Vpv corresponding to said no-load voltage Vo reading;

and, when controlling the dynamic system 2, controlling said dynamic system 2 so as to thereon confer a configuration determined on the basis of at least one of the numerical values Ipv and/or Ipv and Vpv determined.

Said method then involves, more particularly:

electrically isolating the photovoltaic generator 3 from the battery 4, reading the no-load voltage Vo of the photovoltaic generator 3, determining on the basis of the no-load voltage Vo reading a numerical value Vpv corresponding to said no-load voltage Vo reading, and comparing said numerical value Vpv determined with at least one reference threshold value (Vthreshold1; Vthreshold2);

electrically isolating the photovoltaic generator 3 from the battery 4, reading the short circuit current Icc of the isolated photovoltaic generator 3, determining on the basis of at least one reading of the short circuit current Icc a numerical value Ipv corresponding to said reading or readings of the short circuit current Icc, and comparing said numerical value Ipv determined with at least one reference threshold value (Ithreshold1; Ithreshold2);

when said numerical value Vpv determined corresponds to a value range Gv limited by at least one such reference threshold value (Vthreshold1; Vthreshold2) and when said numerical value Ipv determined corresponds to a value range Gi limited by at least one such reference threshold value (Ithreshold1; Ithreshold2), controlling the control system 2 so as to thereon confer a configuration corresponding to these value ranges (Gv; Gi).

In this respect, it will be noted that, according to a preferred embodiment of the invention, the no-load voltage Vo of the photovoltaic generator 3 is read (and even a numerical value Vpv corresponding to said no-load voltage Vo reading, is determined and said numerical value Vpv determined is compared with at least one reference threshold value (Vthreshold1; Vthreshold2)), and the short circuit current Icc of the isolated photovoltaic generator 3 is read (and even a numerical value Ipv corresponding to said reading or readings of the short circuit current Icc is determined, and said numerical value Ipv determined is compared with at least one reference threshold value (Ithreshold1; Ithresholdl2)), sequentially.

Thus, and according to a preferred embodiment of the invention, first of all the no-load voltage Vo of the photovoltaic generator 3 is read (and even a numerical value Vpv corresponding to said no-load voltage Vo reading, is determined and said numerical value Vpv determined is compared with at least one reference threshold value (Vthreshold1; Vthreshold2)), and then the short circuit current Icc of the isolated photovoltaic generator 3 is read (and even a numerical value Ipv corresponding to said reading or readings of the short circuit current Icc is determined, and said numerical value Ipv determined is compared with at least one reference threshold value (Ithreshold1; Ithresholdl2)).

Moreover, and as mentioned above, the dynamic system 2 is controlled so as to thereon confer a configuration corresponding to the value ranges (Gv; Gi).

In this respect, it will be noted that such control is, preferably afforded by controlling the dynamic system 2 so as to thereon confer a configuration corresponding to the combination of said two value ranges (Gv; Gi), one Gv corresponding to a value range Gv limited by at least one reference threshold value (Vthreshold1; Vthreshold2) whilst the other Gi corresponds to a value range Gi limited by at least one reference threshold value (Ithreshold1; Ithreshold2).

Moreover, it will be noted that the control of such a dynamic system 2 can be afforded based, on the one hand on a plurality of value ranges Gv each limited by at least one reference threshold value (Vthreshold1; Vthreshold2) and, on the other hand, on a plurality of value ranges Gi each limited by at least one reference threshold value (Ithreshold1; Ithreshold2).

The method then involves defining a particular configuration of the dynamic system 2 for each combination of two of said value ranges (Gv; Gi) and then of controlling said dynamic system 2 so as to thereon confer a configuration corresponding to such a combination.

Thus, the method involves, in particular, electrically isolating the photovoltaic generator 3 from the battery 4.

In this respect, it will be noted that such an electrical isolation of the photovoltaic generator 3 is made temporarily, for at least the time necessary to enable the implementation of the above-mentioned method of controlling whereas for the rest of the time the photovoltaic generator 3 is connected to the battery 4 in order to charge the latter.

In fact, the photovoltaic generator 3 is electrically isolated at least while the no-load voltage Vo of said no-load voltage 3 is read, and even while a numerical value Vpv corresponding to said no-voltage voltage Vo is determined and/or while said numerical value Vpv determined is compared with at least one reference threshold value (Vthreshold1; Vthreshold2).

According to another characteristic of said method, the photovoltaic generator is isolated, the no-load voltage Vo is read, the numerical value Vpv corresponding to said no-load voltage Vo reading is determined and said numerical value Vpv determined is compared with at least one reference threshold value (Vthreshold1; Vthreshold2), at predetermined and/or regular intervals.

In fact, such an interval is chosen according to the needs of the application and/or the electronic components used to implement the method.

In the particular case of a dynamic apparatus 1 consisting of a roller shutter, said interval is between 30 seconds and 10 minutes inclusive, preferably of the order of 1 minute.

According to an additional characteristic, the photovoltaic generator is isolated, the no-load voltage Vo is read, the numerical value Vpv corresponding to said no-load voltage Vo reading is determined and said numerical value Vpv determined is compared with at least one reference threshold value (Vthreshold1; Vthreshold2), successively and governed by a sequential-type control.

As mentioned above, the method involves determining a numerical value Vpv corresponding to a no-load voltage Vo reading.

In this respect, it will be noted that, in a first embodiment, when such a numerical value Vpv is determined, a voltage corresponding to the no-load voltage Vo reading is converted directly into a numerical value.

Another embodiment involves, when such a numerical value Vpv is determined, converting into a numerical value a voltage corresponding to a fraction (division) of said no-load voltage Vo. To do this, first of all the no-load voltage Vo reading is divided to obtain a fraction of said no-load voltage reading and said fraction of said no-load voltage Vo reading is then converted to obtain said numerical value Vpv corresponding to the no-load voltage Vo reading.

Such an embodiment makes it possible, advantageously, to bring the no-load voltage Vo reading within an admissible range by means (described below) for converting an analog signal into a digital signal.

The method also involves comparing the numerical value Vpv determined with at least one reference threshold value (Vthreshold1; Vthreshold2).

According to an additional characteristic, before making such a comparison, such a reference threshold value (Vthreshold1; Vthreshold2) is set, and such a reference threshold value (Vthreshold1; Vthreshold2) may even be even saved in a memory, in particular one that is part of the control device 5.

In this respect, it will be noted that a reference threshold value (Vthreshold1; Vthreshold2) is set, once again on the basis of values taken from the literature and/or values determined experimentally and/or values determined by digital simulation and/or values determined by calculation, as mentioned above.

Another characteristic of the method according to the invention involves, when the no-load voltage Vo of the photovoltaic generator 3 is read, also reading the temperature of the control device 5 and, either operating the dynamic system 2 when said temperature is higher than a threshold temperature Ts, or inhibiting the operation of said dynamic system 2 when said temperature is lower than said threshold temperature Ts.

Once again, said threshold temperature Ts may have been determined, validated and adjusted as described above.

An additional characteristic of the method involves the operation of the dynamic system 2 being inhibited within at least one predefined time range.

In fact and more precisely, within said predefined time range, such operation is inhibited by preventing the comparison between the numerical value Vpv determined and at least one reference threshold value (Vthreshold1; Vthreshold2), more particularly by inhibiting the comparator function of the dynamic apparatus 1.

Within said time range, the reading of the no-load voltage Vo and/or the determination of the numerical value Vpv corresponding to said no-load voltage Vo reading can also be prevented.

In this respect, it will be noted that the predefined time range during which the operation of the dynamic system is inhibited may, for example, extend from 22.30 to 7.00.

Moreover, such a time range can also be modulated according to the day of the week and/or the season and/or the geographical location and/or the geographical orientation of the dynamic system 2 and/or the dynamic apparatus 1.

Such an embodiment makes it possible, advantageously, to avoid the dynamic system 2 being operated too early in the morning or too late.

The method described above makes it possible, in fact, to control the dynamic apparatus 1 (more particularly at least the dynamic system 2) on the basis of the sunlight.

Figure 7:
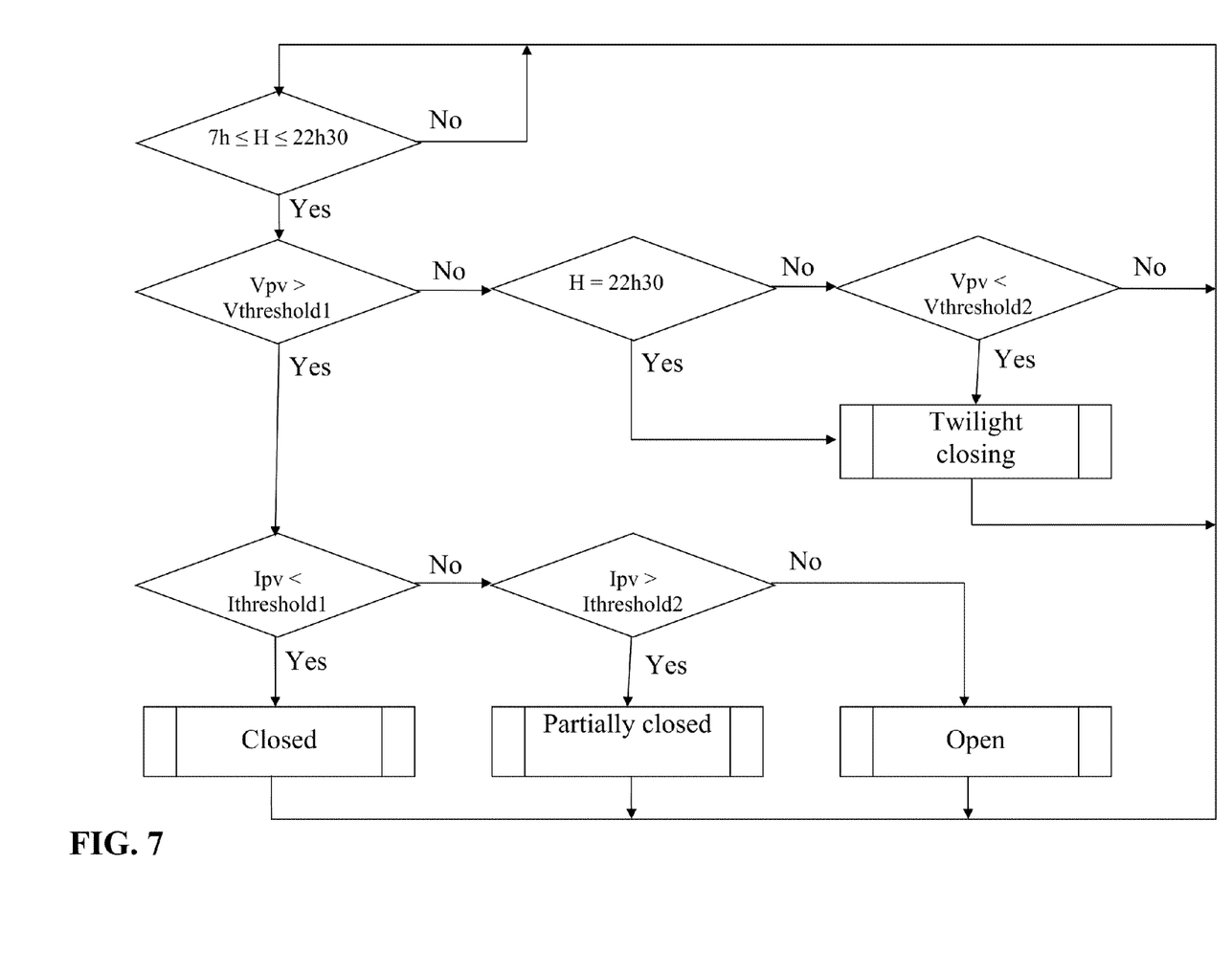
FIG. 7 is a flow chart illustrating the method of controlling a dynamic apparatus on the basis of the sunlight.

In a particular embodiment, such control is carried out in accordance with the flow chart provided in FIG. 7.

In particular, said method involves controlling the dynamic apparatus 1 on the basis, on the one hand, of at least one reading of the short circuit current Icc of the photovoltaic generator 3 and, on the other hand, of at least one reading of the no-load voltage Vo of the photovoltaic generator 3.

Said method involves, more particularly, before controlling the dynamic apparatus 1 on the basis of at least one reading of the short circuit current Icc of the photovoltaic generator 3, first controlling said dynamic apparatus on the basis of at least one reading of the no-load voltage Vo of said photovoltaic generator 3.

Thus, before comparing with at least one reference threshold value (Ithreshold1; Ithreshold2) the numerical value Ipv determined corresponding to at least one short circuit current Icc reading, a numerical value Vpv determined on the basis of at least one reading of the no-load voltage Vo of the photovoltaic generator 3 electrically isolated from the battery 4 and corresponding to said no-load voltage Vo reading is compared with at least one reference threshold value (Vthreshold1; Vthreshold2).

When the numerical value Vpv determined is higher than a first reference threshold value Vthreshold1, then the numerical value Ipv determined is compared with at least one reference threshold value (Ithreshold1;Ithreshold2) and the dynamic system 2 is controlled so as to thereon confer, depending on the case, at least one other configuration.

In this respect and as mentioned above, it will be noted that, when the numerical value Ipv determined is lower than a first reference threshold value Ithreshold1, the dynamic system 2 is controlled so as to thereon confer a first configuration.

In this respect, it will be noted that when the method also involves reading the temperature T of the control device 5, said dynamic system 2 is controlled so as to thereon confer a second configuration, when the numerical value Ipv determined is lower than a first reference threshold value Ithreshold1 and the temperature T of the control device 5 is lower than a threshold temperature Tthreshold1.

In the particular case of a dynamic apparatus 1 consisting of a roller shutter, said first configuration may consist of a position where the apron of said roller is completely closed.

However, when the numerical value Ipv determined is higher than said first reference threshold value Ithreshold1:
  either the dynamic system is controlled so as to thereon confer a second configuration when the numerical value Ipv determined is higher than a second reference threshold value Ithreshold2;
  or the dynamic system is controlled so as to thereon confer a third configuration when the numerical value Ipv determined is lower than the second reference threshold value Ithreshold2;

In this respect, it will be noted that when the method also involves reading the temperature T of the control device 5, said method then involves, when the numerical value Ipv determined is higher than a first reference threshold value Ithreshold1:
  either controlling the dynamic system so as to thereon confer a third configuration when the numerical value Ipv determined is higher than a second reference threshold value Ithreshold2 and the temperature T of the control device 5 is higher than a threshold temperature Tthreshold2;
  or controlling the dynamic system so as to thereon confer a fourth configuration when the numerical value Ipv determined is lower than the second reference threshold value Ithreshold2 or when the temperature T of the control device 5 is lower than a threshold temperature Tthreshold2;

As mentioned above and in the particular case of a dynamic apparatus 1 consisting of a roller shutter, the second configuration corresponds to a partially closed position (closed with openings) of the apron of said roller shutter whilst said third configuration may consist of said apron being completely open.

However, when the numerical value Vpv determined is lower than a first reference threshold value Vthreshold1, the dynamic system 2 is controlled so as to thereon confer a fourth configuration, when the numerical value Vpv determined is lower than a second reference threshold value Vthreshold2 or when the current time H read corresponds to a predetermined time for which the dynamic system adopts said fourth configuration.

In the particular case of a dynamic apparatus 1 consisting of a roller shutter, said fourth configuration corresponds to a twilight closure position of the apron of said roller shutter.

Additionally, the control method according to the invention may also involve, before comparing the numerical value Vpv determined with at least one reference threshold value (Vthreshold1; Vthreshold2), testing whether the current time H is situated within the predefined time range (in particular 22.30 to 7.00) in order either to prevent such a comparison when this is the case (and therefore inhibit the operation of the dynamic system 2) or to authorise such a comparison when it is not the case (and therefore authorise the operation of the dynamic system 2).

In fact, the invention also relates to a dynamic apparatus 1 comprising, on the one hand, means (50 to 54) described above, designed in particular to implement the above-mentioned method based on readings of the short circuit current Icc of the photovoltaic generator 3, and on the other hand, additional means, described below, designed in particular to implement the additional steps of the control method based on no-load voltage Vo readings.

According to the invention and as shown in FIG. 6, said dynamic apparatus 1 comprises said device 5 for controlling said dynamic apparatus 1 which 5 then also comprises:
- another means 55 for electrically isolating (temporarily) the photovoltaic generator from the battery;
- means for reading the no-load voltage Vo of the photovoltaic generator 3;
- means 56 for determining a numerical value Vpv corresponding to said no-load voltage Vo reading;
- means 57 for comparing said numerical value Vpv determined with at least one reference threshold value (Vthreshold1; Vthreshold2);
- means 58 for controlling at least the means 55 for electrically isolating, the means 56 for determining a numerical value Vpv as well as the means 57 for comparing;
- means for controlling the dynamic system according to the result of the comparison between said numerical value Vpv determined and at least one such reference threshold value (Vthreshold1; Vthreshold2).

As far as the means 55 for electrically isolating the photovoltaic generator 3 is concerned, this can, in a first embodiment, consist at least partly of an electromechanical relay placed between the photovoltaic generator 3 and the battery 4, and comprising a normally closed contact and a coil, more particularly supplied by the battery 4.

However, and in a second embodiment, the means 55 for electrically isolating the photovoltaic generator consists at least partly of a diode with a very low leakage current placed between the photovoltaic generator 3 and the battery 4.

In such a case, said diode has a threshold voltage determined so that the means 55 for electrically isolating the photovoltaic generator 3 isolates the latter 3 for as long as the voltage at the terminals of said photovoltaic generator 3 is lower than the voltage of the battery 4 plus the threshold voltage of the diode.

Thus, as long as the voltage at the terminals of the photovoltaic generator 3 is lower than that of the battery 4 plus the threshold voltage of the diode, the photovoltaic generator 3 behaves as if it were unloaded. Said embodiment makes it possible, advantageously, to avoid physically disconnecting the photovoltaic generator 3.

As mentioned above, the control device 5 comprises means 56 for determining a numerical value Vpv corresponding to the no-load voltage Vo reading.

Said means 56 for determining such a numerical value Vpv comprises at least means 560 for converting an analog signal, corresponding to the no-load voltage Vo reading, into a digital signal corresponding to said no-load voltage Vo reading.

In fact, such means 560 for converting such a signal consists more particularly of an analog-to-digital converter, notably of the standalone 8-bit (or more) type.

Additionally, the means 56 for determining a numerical value Vpv also comprises a voltage divider 561, placed between the photovoltaic generator 3 and the means 560 for converting an analog signal into a digital signal.

Such a voltage divider 561 is designed to divide the no-load voltage Vo reading of the photovoltaic generator 3, in order to obtain a voltage Vo' corresponding to the no-load voltage Vo of the photovoltaic generator, whose value is within a range of values admissible by the means 560 for converting an analog signal into a digital signal.

In a particular embodiment of the invention, said voltage divider 561 consists of a resistor bridge whose ratio is equal to the maximum input voltage of the conversion means 560 divided by the maximum no-load voltage of the photovoltaic generator 3.

Additionally, said voltage divider 561 is designed so that the polarisation current of the resistor bridge does not exceed a few tens of microamps so that the resulting charge at the photovoltaic generator 3 output can be considered as negligible.

As mentioned above, the control device 5 comprises means 58 for controlling at least the means 55 for electrically isolating, the means 56 for determining a numerical value Vpv as well as the means 57 for comparing.

In fact, said control means 58 is designed to control, at predetermined and/or regular intervals, the means 55 for electrically isolating, the means 56 for determining a numerical value Vpv and the means 57 for comparing, and even the means for reading and/or the means for operating.

In this respect, it will be noted, that in the particular case of a roller shutter, said control means 58 may be designed to provide said control at predetermined, regular intervals of between 30 seconds and 10 minutes inclusive, preferably of the order of 1 minute.

Additionally, said control means 58 may also be designed to control, successively, the means 55 for electrically isolating, the means 56 for determining a numerical value and the means 57 for comparing.

In a preferred embodiment of the invention, such control means 58 consists of a measurement sequencer designed to regulate the operations necessary to operate the dynamic system 2, namely to isolate the photovoltaic generator 3, then to trigger the analog-to-digital conversion, and after that to carry out the comparison and finally to reconnect the photovoltaic generator 3.

According to an additional characteristic, the control device 5 also comprises at least means 54 for setting at least one reference threshold value (Vthreshold1; Vthreshold2).

Such means for setting parameters may consist either of an adjustable potentiometer or similar, or a memory containing at least one settable reference threshold value (Vthreshold1; Vthreshold2). Such a memory will be of the non-volatile type and may be internal or external.

According to another characteristic, the control device 5 also comprises means 59 for inhibiting the operation of the dynamic system 2 within at least one predefined time range.

In fact, said means 59 for inhibiting the operation of the dynamic system 2 is, preferably, designed to prevent the comparison between the numerical value Vpv determined and at least one reference threshold value (Vthreshold1; 2), more particularly by inhibiting the means 57 for comparing that is part of the control device 5.

Additionally, said means 59 for inhibiting the operation may also be designed to inhibit the means for reading the no-load voltage Vo and/or the means 56 for determining a numerical value Vpv.

In this respect, it will be noted that the predefined time range during which the operation of the dynamic system is inhibited may, for example, extend from 22.30 to 7.00.

Moreover, such a time range can also be modulated according to the day of the week and/or the season and/or the geographical location and/or the geographical orientation of the dynamic system 2 and/or the dynamic apparatus 1.

Such an embodiment makes it possible, advantageously, to avoid the dynamic system 2 being operated too early in the morning or too late.

In a preferred embodiment of the invention, the inhibiting means 59 consists at least partly of a real-time clock and calendar.

The control device 5 also comprises means 8 for selecting either at least a part of means 51 for determining a numerical value Ipv (more particularly the current-to-voltage converter 510, or even the amplifier 512) corresponding to at least one short circuit current Icc reading, or at least a part of the means 56 for determining a numerical value Vpv (more particularly the voltage divider 561) corresponding to a no-load voltage Vo reading.

Said selection means 8 is placed between the photovoltaic generator 3 and means (511; 560) for converting an analog signal into a digital signal.

The presence of said selection means 8 makes it possible, advantageously, for the control device 5 to comprise only one means (511; 560) for converting an analog signal into a digital signal to which an analog signal is sent corresponding, depending on the case, to a short circuit current Icc or to a no-load voltage Vo, under the impulsion of said selection means 8.

In a particular embodiment said selection means 8 consists of an analog multiplexer, a channel selector or similar.

As mentioned above, the control device 5 comprises means (53; 58) for controlling at least said means (50; 55) for electrically isolating, said means (51; 60) for determining a numerical value Vpv as well as said means (52; 57) for comparing.

According to an additional characteristic, said control means (53; 58) may again be designed to also control the selection means 8, and even also the means 7 for protecting the means (50; 55) for electrically isolating the photovoltaic generator 3.

Such a control means (53; 58) will preferably consist of a measurement sequencer.

Another characteristic of the control device 5 involves it comprising a single analog-to-digital converter (511; 560) constituting, advantageously, on the one hand, at least a part of the means 51 for determining a numerical value Ipv corresponding to at least one short circuit current Icc reading and, on the other hand, at least a part of the means 56 for determining a numerical value Vpv corresponding to a no-load voltage reading.

Yet another characteristic involves the control device 5 comprising a single comparator constituting, advantageously, on the one hand, the means 52 for comparing with at least one reference threshold value (Ithreshold1; Ithreshold2), a numerical value Ipv determined corresponding to at least one short circuit current Icc reading and, on the other hand, the means 57 for comparing with at least one reference threshold value (Vthreshold1; Vthreshold2) a numerical value Vpv determined corresponding to the no-load voltage reading.

Additionally, the control device 5 comprises a single measurement sequencer constituting, advantageously, the means (53; 58) for controlling at least:
- the means (50; 55) for electrically isolating the photovoltaic generator 3 from the battery 4;
- the means 8 for selecting either at least a part of the means 51 for determining a numerical value Ipv corresponding to at least one short circuit current Icc reading, or at least a part of the means 56 for determining a numerical value Vpv corresponding to a no-load voltage Vo reading;
- the means 51 for determining a numerical value Ipv corresponding to at least one short circuit current Icc reading;
- the means 52 for comparing said numerical value Ipv determined with at least one reference threshold value (Ithreshold1; Ithreshold2);
- the means 56 for determining a numerical value Vpv corresponding to said no-load voltage Vo reading;
- the means 57 for comparing said numerical value Vpv determined with at least one reference threshold value (Vthreshold1; Vthreshold2).

Additionally, such a measurement sequencer also constitutes the means 53 for controlling the means 7 for protecting the means 50 for electrically isolating the photovoltaic generator 3.

Finally, the control device 5 comprises a microcontroller 6 incorporating at least the selection means 8, the analog-to-digital converter (511; 560), the comparator (52; 57) as well as the measurement sequencer (53; 58).

Additionally, said microcontroller 6 also incorporates at least means 54 for setting at least one reference threshold value (Ithreshold1, Ithreshold2; Vthreshold1, Vthreshold2), more particularly consisting of a memory containing at least one settable reference threshold value (Ithresholdl1, Ithreshold2; Vthreshold1, Vthreshold2).

We claim:

1. A method of controlling a window shade, based on sunlight, said window shade comprising a roller shutter apron, a photovoltaic generator, a battery storing electrical energy supplied by said photovoltaic generator and supplying electrical energy to said roller shutter apron, and a control module, said method comprising the steps of:

electrically isolating said photovoltaic generator from said battery;

taking a reading of short circuit current of the isolated photovoltaic generator;

determining a numerical value being based on at least one reading of short circuit current and corresponding to the reading of the short circuit current;

comparing said numerical value determined with at least one reference threshold value; and controlling said roller shutter apron, when said numerical value determined corresponds to a value range limited by the at least one reference threshold value so as to thereon confer a configuration corresponding to said value range.

2. The method of controlling the window shade, according to claim 1, further comprising the steps of:
taking, at intervals over time, several readings of the short circuit current at terminals of the isolated photovoltaic generator;
for each short circuit current reading, determining an intermediate numerical value corresponding to each short circuit current reading;
determining an average numerical value by calculating an average of intermediate numerical values corresponding to the short circuit current readings;
comparing said average numerical value determined with at least one reference threshold value; and
controlling said roller shutter apron, according to a result of the step of comparing.

3. The method of controlling the window shade, according to claim 1,
wherein the step of determining the numerical value comprises converting the short circuit current reading into a voltage and converting said voltage into said numerical value, corresponding to said voltage and the short circuit current reading.

4. The method of controlling the window shade, according to claim 1, before the step of comparing the numerical value, further comprising the step of:
setting the reference threshold value by one of a group consisting of an adjustable potentiometer and a memory of saved reference threshold values.

5. The method of controlling the window shade, according to claim 1,
wherein the step of taking the reading of the short circuit current, further comprises
taking a reading of temperature of said control module,
wherein operation of said roller shutter apron is authorized when said temperature is higher than a threshold temperature, and
wherein operation of said roller shutter apron is inhibited when said temperature is lower than said threshold temperature.

6. The method of controlling the window shade, according to claim 1, before the step of electrically isolating the photovoltaic generator, further comprising the step of:
protecting at least one of a group consisting of: means for electrically isolating the photovoltaic generator, and at least a part of means for determining the numerical value corresponding to the reading of the short circuit current, when the short circuit current is higher than a defined setpoint.

7. The method of controlling the window shade, according to claim 1,
wherein, when the numerical value determined is lower than a first reference threshold value, said roller shutter apron is controlled so as to thereon confer a first configuration.

8. The method of controlling the window shade, according to claim 1,
wherein said roller shutter apron is controlled so as to have a second configuration, when the numerical value determined is higher than a first reference threshold value and when the numerical value determined is higher than a second reference threshold value, and
wherein said roller shutter apron is controlled so as to have a third configuration when the numerical value determined is higher than the first reference threshold value and when the numerical value determined is lower than the second reference threshold value.

9. A window shade assembly, comprising:
a roller shutter apron,
a photovoltaic generator, connected to said roller shutter apron,
a battery being supplied with electrical energy by the photovoltaic generator and supplying said roller shutter apron with electrical energy, and
a control module based on sunlight,
wherein said photovoltaic generator is electrically isolated from said battery,
wherein the isolated photovoltaic generator has the short circuit current,
wherein said control module determines said numerical value being based on at least one reading of short circuit current and corresponding to the reading of the short circuit current,
wherein said control module compares said numerical value determined with at least one reference threshold value,
wherein said roller shutter apron is controlled by said control module, when said numerical value corresponds to a value range limited by the at least one reference threshold value, said roller shutter apron having a configuration corresponding to said value range, and
wherein said control module comprises:
means for electrically isolating the photovoltaic generator from the battery;
means for taking a reading of a short circuit current of the photovoltaic generator;
means for determining a numerical value corresponding to at least one reading of the short circuit current;
means for comparing said numerical value determined with at least one reference threshold value;
means for controlling an isolating means, said means for determining the numerical value, and said means for comparing; and
means for controlling roller shutter apron according to a result of comparison between said numerical value and the reference threshold value.

10. The window shade assembly, according to claim 9, wherein the means for electrically isolating the photovoltaic generator comprises an electromechanical relay, placed between the photovoltaic generator and the battery, and wherein said electromechanical relay comprises a closed contact, and a coil supplied by the battery.

11. The window shade assembly, according to claim 9, wherein the means for electrically isolating the photovoltaic generator comprises a diode placed between the photovoltaic generator and the battery and a switching transistor placed upstream of said diode.

12. The window shade assembly, according to claim 9, wherein the means for determining the numerical value comprises means for converting the reading of the short circuit current into a voltage, and means for converting an analog signal corresponding to said voltage into a numerical value corresponding to said voltage.

13. The window shade assembly, according to claim 9, wherein the means for determining the numerical value comprises means for converting each reading into a voltage, means for converting an analog signal corresponding to said voltage into an intermediate numerical value, and means of calculating an average of intermediate numerical values to obtain the numerical value corresponding to the readings of the short circuit current.

14. The window shade assembly, according to claim 9, further comprising:
  means for setting the at least one reference threshold value, the means for setting being comprised of at least one of a group consisting of an adjustable potentiometer and a memory containing at least one settable reference threshold value.

15. The window shade assembly, according to claim 9, further comprising:
  a microcontroller incorporating at least one of a group consisting of:
a part of the means for determining the numerical value, a part of the means for comparing said numerical value, the control module, a memory containing at least one settable reference threshold value, and an amplifier.

16. The window shade assembly, according to claim 9, further comprising:
  means for protecting at least one of the group consisting of the means for electrically isolating the photovoltaic generator and the means for determining the numerical value, when the short circuit current is higher than a defined set point.

\* \* \* \* \*